United States Patent [19]

Matsumura

[11] Patent Number: 4,657,356
[45] Date of Patent: Apr. 14, 1987

[54] STEREOSCOPIC MICROSCOPE WITH A PAIR OF IMAGE ROTATION CORRECTING MEANS

[75] Inventor: Isao Matsumura, Yokosuka, Japan

[73] Assignee: Canon Kabushiki Kaisha, Tokyo, Japan

[21] Appl. No.: 749,504

[22] Filed: Jun. 27, 1985

[30] Foreign Application Priority Data

Jul. 4, 1984 [JP] Japan ............................. 59-138352
Jul. 4, 1984 [JP] Japan ............................. 59-138353

[51] Int. Cl.⁴ ............................................. G02B 21/22
[52] U.S. Cl. ................................. 350/516; 350/515; 350/522; 350/539
[58] Field of Search ................. 350/522, 511–516, 350/502, 507, 539, 145, 171, 173, 169

[56] References Cited

U.S. PATENT DOCUMENTS

| | | | |
|---|---|---|---|
| 2,152,726 | 4/1939 | Baroni | 350/539 |
| 3,170,983 | 2/1965 | Riedel | 350/513 |
| 3,734,593 | 5/1973 | Mori | 350/515 |
| 4,035,057 | 7/1977 | Klein | 350/522 |
| 4,061,135 | 12/1977 | Widran et al. | 350/539 |
| 4,138,191 | 2/1979 | Peyman et al. | 350/516 |
| 4,167,302 | 9/1979 | Karasawa | 350/516 |
| 4,232,933 | 11/1980 | Nakahashi | 350/502 |
| 4,277,130 | 7/1981 | Takahashi | 350/515 |
| 4,341,435 | 7/1982 | Lang et al. | 350/515 |
| 4,412,727 | 11/1983 | Taira | 350/522 |
| 4,427,269 | 1/1984 | Lang et al. | 350/539 |

FOREIGN PATENT DOCUMENTS

| | | | |
|---|---|---|---|
| 1217099 | 5/1966 | Fed. Rep. of Germany | 350/516 |
| 2754614 | 2/1984 | Fed. Rep. of Germany | 350/574 |
| 979153 | 1/1965 | United Kingdom | 350/515 |
| 2120402 | 12/1983 | United Kingdom | 350/515 |

*Primary Examiner*—Jon W. Henry
*Attorney, Agent, or Firm*—Fitzpatrick, Cella, Harper & Scinto

[57] ABSTRACT

A stereoscopic microscope is provided with a first optical system for stereoscopically observing therethrough a part to be examined, a second optical system for stereoscopically observing therethrough the part to be examined, and means for rotating at least a part of the second optical system relative to the first optical system.

8 Claims, 9 Drawing Figures

STEREOSCOPIC MICROSCOPE WITH A PAIR OF IMAGE ROTATION CORRECTING MEANS

BACKGROUND OF THE INVENTION

1. Field of the Invention

This invention relates to a stereoscopic microscope used in ophthalmic operations or the like, and in particular to a stereoscoptic microscope provided with an observation optical system for the assistant and adapted to enable assistance to the operator to be rendered quickly during an operation.

2. Description of the Prior Art

Generally, when an operation is to be performed by the use of a stereoscopic microscope, the assistant assists the operator by observing from sideways of the operator. Therefore, the assistant need be constantly stereoscopically observing the same affected part as that observed by the operator. Also, a student need to stereoscopically observe the same affected part as that observed by the operator when operation instruction is given to the student.

Heretofore, microscopes of this type have been of a structure in which the observation optical system for an assistant greatly deviates from the direction in which the operator observes or stereoscopic observation is not permitted.

In order to eliminate this problem, Japanese Utility Model Publication No. 39364/1980 enables the assistant to effect substantially the same stereoscopic observation as that effected by the operator. In this case, however, the assistant can position himself only in a predetermined direction with respect to the operator and the range in which the operator can move is limited. Further, the assistant cannot observe the image as seen from the same direction as the direction in which the operator observes.

SUMMARY OF THE INVENTION

It is an object of the present invention to provide a sterescopic microscope which enables the assistant to observe at any position relative to the operator.

It is a further object of the present invention to provide a stereoscopic microscope which enables the assistant to observe the image in directions coincident with the horizontal and vertical directions in the operator's observation.

DESCRIPTION OF THE PREFERRED EMBODIMENTS

Figure 1:
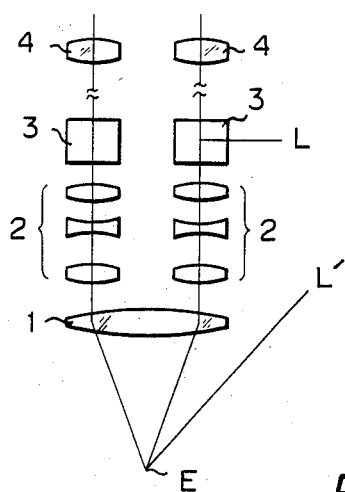
FIGS. 1 and 2 show examples of the prior art.

FIG. 1 shows the optical system of a stereoscopic microscope according to the prior art. The affected part E is observed by the operator with the aid of an eyepiece 4 through an objective lens 1, a zoom lens 2 and a beam splitter 3.

On the other hand, the assistant observes the affected part from a direction L' entirely different from the direction in which the operator observes, or observes the affected part while separating the light beam from one L of the observation systems for the left and right eyes of the operator.

Figure 2:
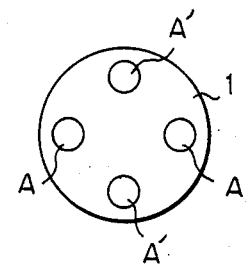

FIG. 2 shows another example of the prior art. Letter A designates observation optical systems for the operator and letter A' denoted observation optical systems for the assistant. The observation optical systems A and A' are disposed as shown as viewed from the direction of the optic axis of an objective lens 1.

In these examples of the prior art shown in FIGS. 1 and 2, the already described problems occur.

Figure 3:
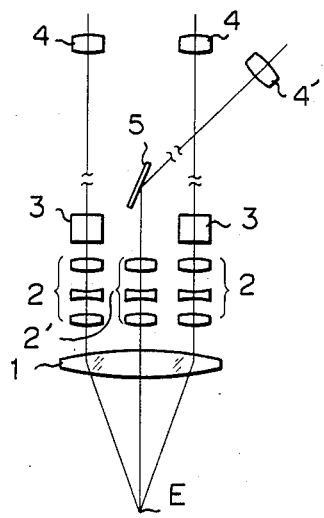
FIGS. 3 to 6 show embodiments of the present invention.

FIG. 3 shows an embodiment of the present invention. The affected part E is observed by the operator through an objective lens 1 whose object side focus is made coincident with a part to be examined, a zoom lens 2, a beam splitter 3 and an eyepiece 4.

On the other hand, the assistant observes the affected part E through the objective lens 1, a zoom lens 2', a mirror, 5 and an eyepiece 4'. This optical system for the assistant is rotatable about the center O of the object lens as viewed from the direction of the optic axis of the objective lens 1 so as to vary the distance between the optic axes for the operator and the assistant as shown in FIG. 4A.

Figure 4A:
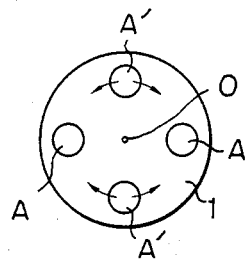

That is, in FIG. 4A, the observation optical systems for the operator are disposed at A with respect to the objective lens 1, and the observation optical systems for the assistant are disposed at A' with respect to the objective lens 1, and the pair of observation optical systems A' for the assistant's left nd right eyes are rotated as a set about the center O of the objective lens.

Figure 4B:
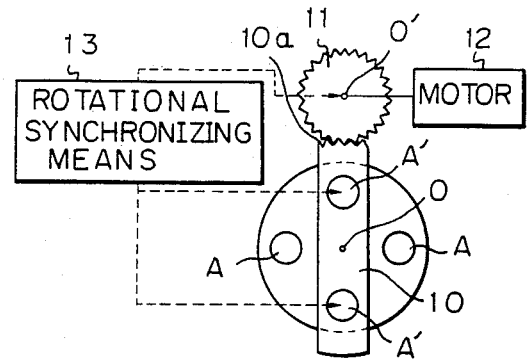

FIG. 4B shows a driving system. A connecting plate 10 for connecting the bodies of the observation optical systems A' for the assistant has a gear portion 10a meshing with a gear 11 driven about a point O' by a motor 12, whereby the connecting plate 10 is rotated about the point O. Reference numeral 13 designates rotational synchronizing means which will later be described.

Figure 5:
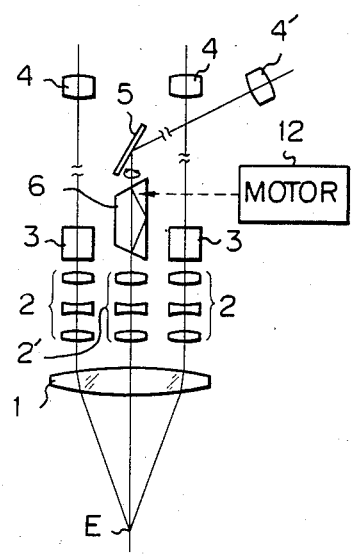
Figure 6:
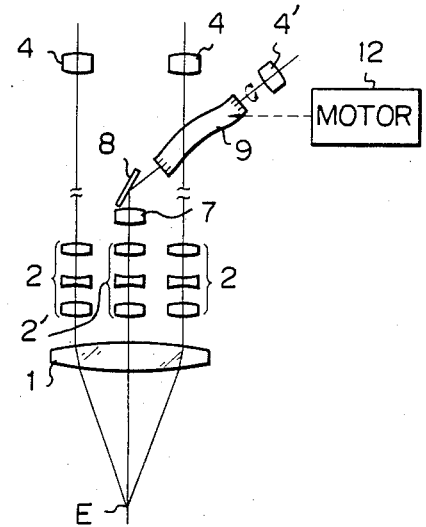

FIGS. 5 and 6 show embodiments in which image rotating means are further added to the observation optical systems for the assistant. Description will first be made on the assumption that the distance between the optic axes of the optical systems for the operator and the assistant is not varied. In FIG. 5, a rotary prism 6 is disposed in each of the pair of optical paths of the observation optical systems for the assistant, and by rotating this pair of rotary prisms about the optic axes of the observation optical systems for the assistant, the assistant can observe the affected part while keeping a direction different from the direction in which the operator observes and nevertheless in the same directions as the vertical and horizontal directions of the operator's observation field. The pair of rotary prisms 6 are rotated in the same direction by a motor 12 as viewed from the direction of the optic axis. Further, by synchronizing the rotation of the observation optical system A' for the assistant shown in FIG. 4 relative to the center of the objective lens 1, i.., the rotation for varying the distance between the optic axes of the optical systems for the operator and the assistant, with the rotation of the rotary prisms 6 shown in FIG. 5 relative to the optic axes of the observation optical systems A' for the assistant through the rotational synchronizing means 13 of FIG. 4B, the assistant can always observe the affected part in the same manner as the operator does, without rotation of the image, whatever observation position he may assume. That is, by rotating the rotary prisms by a suitable amount in accordance with the rotation of the observation optical systems A' for the assistant relative to the center O of the objective lens 1, the assistant can observe the affected part in the same manner as the operator does. FIG. 6 shows an embodiment in which an image guide instead of rotary prisms is used as the image rotating means.

The image guide 9 has one end thereof twistable relative to the other end and enables the revision of the rotation of the image of the affected part in conformity with the position of the assistant relative to the operator.

It is also possible to synchronize the twist of the image guide 9 with the rotation of the observation optical systems A' for the assistant shown in FIG. 4 relative to the center of the objectibe lens 1.

Figure 7A:
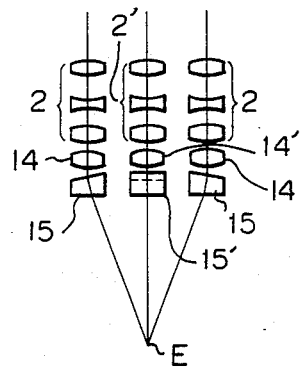
FIGS. 7A and 7B show modifications.
Figure 7B:
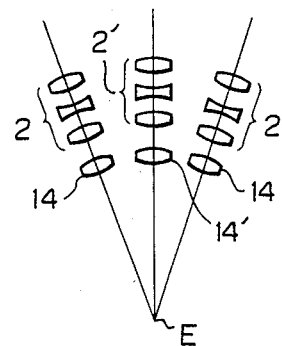

In the above-described embodiments, the objective lens is common for the observation optical systems for the operator and the observation optical systems for the assistant, but alternatively, objective lenses may be individually provided for the respective optical systems as shown in FIGS. 7A and 7B. In FIG. 7A, an objective lens 14 or 14' is independently disposed below each of the zoom lenses 2 and 2', and respective angles of vergence toward the part E to be examined are formed by the desposition of dflection prisms 15 and 15' below the respective objective lenses. In FIG. 7B, the zoom lenses 2 and 2' are directed toward the part E to be examined integrally with objective lenses 14 and 14' added to those zoom lenses, respectively, thereby achieving respective vergences.

According to the present invention, as described above, the assistant can observe the affected part without being limited by the position of the operator and can further observe the affected part also as an image seen from the same direction as the direction in which the operator observes and thus can greatly contribute to the assistance and education of the operator.

The present microscope can be used not only for operations, but also as a tool for observation of flaws in semiconductors.

I claim:

1. A stereoscopic microscope having:
   a first optical system including two optical paths defining two optical axes for stereoscopic observing a part to be examined;
   a second optical system including two optical paths defining two optical axes for stereoscopically observing said part to be examined, said second optical system being capable of revolving about said first optical system; and
   a pair of image rotation correcting means provided in each optical path of said second optical system for the stereoscopic observation, each image rotation correcting means rotating about each optical axis of said second optical system so as to compensate for the revolution of an image observed by said second optical system upon the revolution of said second optical system about said first optical system.

2. A stereoscopic microscope according to claim 1, wherein each of said image rotation correcting means rotates in synchronism with the revolution of said second optical system about said first optical system.

3. A stereoscopic microscope according to claim 1, wherein said image rotation correcting means includes two prisms, one of which rotates about each optical axis of said second optical system.

4. A stereoscopic microscope according to claim 1, wherein said image rotation correcting means includes two image guides, one of which rotates each optical axis of said second optical system.

5. A stereoscopic microscope according to claim 1, wherein at least one of said first and said second optical systems comprises a veriable magnification optical system.

6. A stereoscopic microscope according to claim 5, wherein said variable magnification optical system comprises a zoom lens.

7. A stereoscopic microscope according to claim 1, wherein said first and said second optical systems comprise a common objective optical system used in common therefor.

8. A stereoscopic microscope according to claim 1, wherein each of said first and said second optical systems comprise an objective lens opposed to the examined part.

* * * * *

UNITED STATES PATENT AND TRADEMARK OFFICE
CERTIFICATE OF CORRECTION

PATENT NO. : 4,657,356

DATED : April 14, 1987

INVENTOR(S) : Isao Matsumura

Page 1 of 2

It is certified that error appears in the above-identified patent and that said Letters Patent is hereby corrected as shown below:

COLUMN 1
    Line 9, "stereoscoptic" should read --stereoscopic--.
    Line 19, "need" should read --needs--.
    Line 42, "steroscopic" should read --stereoscopic--.
    Lines 66-67, "one L" should read --one direction L--.

COLUMN 2
    Line 3, "denoted" should read --denotes--.
    Line 16, "mirror, 5" should read --mirror $\underline{5}$,--.
    Line 27, "nd" should read --and--.
    Line 55, "$\underline{1}$, i..," should read --$\underline{1}$, i.e.,--.

COLUMN 3
    Line 12, "objectibe" should read --objective--.
    Lines 20-21, "ver-gence" should read --convergence--.
    Line 22, "desposition" should read --disposition--;
            "dflection" should read --deflection--.
    Line 27, "vergences" should read --convergence--.
    Line 41, "stereoscopic" should read
--stereoscopically--.

COLUMN 4
    Line 25, "rotates each" should read --rotates about each--.

UNITED STATES PATENT AND TRADEMARK OFFICE
CERTIFICATE OF CORRECTION

PATENT NO. : 4,657,356
DATED : April 14, 1987
INVENTOR(S) : Isao Matsumura

It is certified that error appears in the above-identified patent and that said Letters Patent is hereby corrected as shown below:

Column 4, line 29, "veriable" should read -- variable --.

Signed and Sealed this

First Day of September, 1987

Attest:

DONALD J. QUIGG

*Attesting Officer*     *Commissioner of Patents and Trademarks*